United States Patent [19]
Yoshio

[11] Patent Number: 4,471,476
[45] Date of Patent: Sep. 11, 1984

[54] PICKUP ARM DRIVE DEVICE
[75] Inventor: Junichi Yoshio, Saitama, Japan
[73] Assignee: Pioneer Electronic Corporation, Tokyo, Japan
[21] Appl. No.: 339,817
[22] Filed: Jan. 15, 1982
[30] Foreign Application Priority Data

| Jan. 17, 1981 | [JP] | Japan | 56-5601 |
| Jan. 17, 1981 | [JP] | Japan | 56-5602 |
| Jan. 30, 1981 | [JP] | Japan | 56-12299 |
| Jan. 30, 1981 | [JP] | Japan | 56-12300 |

[51] Int. Cl.³ .................... G11B 3/38; G11B 17/06
[52] U.S. Cl. .................... 369/33; 369/41; 369/216
[58] Field of Search ............... 369/41, 33, 216, 217, 369/226

[56] References Cited
U.S. PATENT DOCUMENTS

| 4,093,832 | 6/1978 | Isaacson et al. | 369/41 |
| 4,109,114 | 8/1978 | Baer et al. | 369/41 |
| 4,375,092 | 2/1983 | Yoshio | 369/41 |

FOREIGN PATENT DOCUMENTS 44-10304  5/1969  Japan .................... 369/41

Primary Examiner—Steven L. Stephan
Attorney, Agent, or Firm—Sughrue, Mion, Zinn, Macpeak & Seas

[57] ABSTRACT

In a pickup arm drive device of a record player capable of automatically selecting a desired music on a record disc on which a plurality of pieces of music are recorded, at least two inter-music sensors are arranged near a stylus on the pick-up arm to detect inter-music spaces on the record disc. The outputs of the sensors are subjected to processing and by using the resultant processed outputs, the driving of the pickup arm is switched from "lead-in" or "return" operation to an inter-music position servo operation. Therefore, the stylus of the pickup arm can be lowered exactly onto the inter-music space on the record disc even if the record has an eccentricity or warp.

14 Claims, 34 Drawing Figures

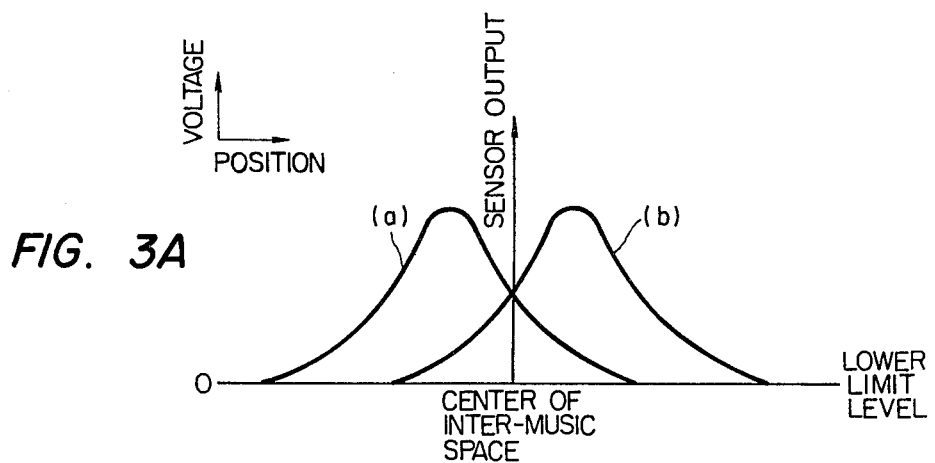
FIG. 3A
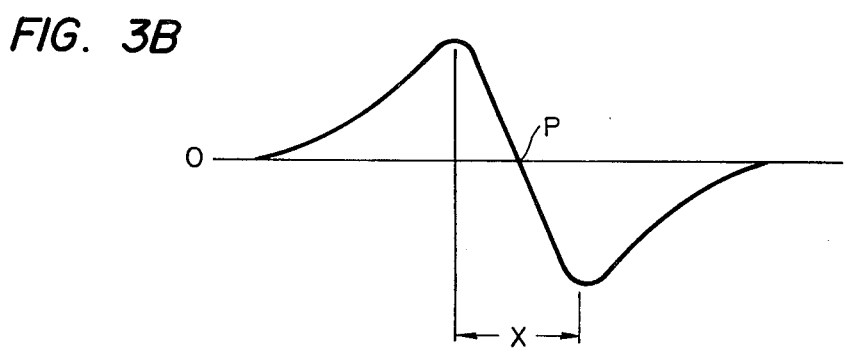
FIG. 3B
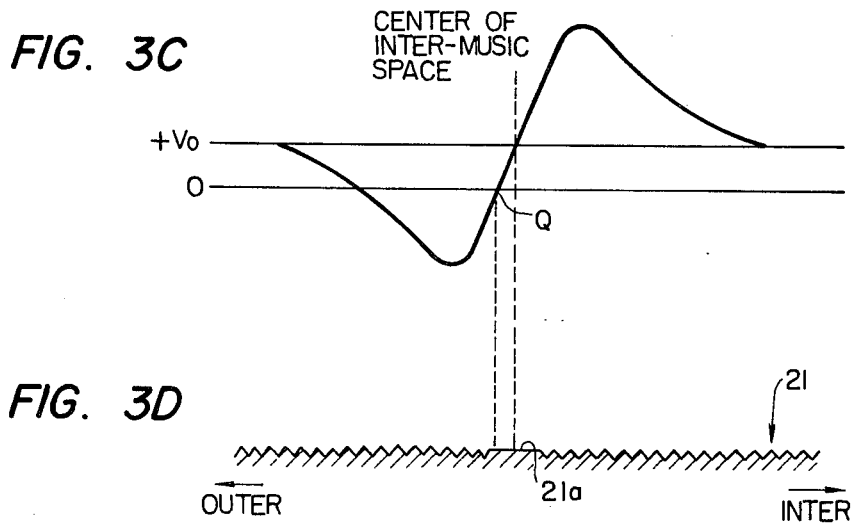
FIG. 3C
FIG. 3D

PICKUP ARM DRIVE DEVICE

BACKGROUND OF THE INVENTION

This invention relates to pickup arm drive devices, and more particularly to a pickup arm drive device of a record player provided with an automatic music selection device which automatically selects a desired piece of music during the playing of a record disc on the surface of which a plurality of pieces of music have been recorded.

A record player provided with such an automatic music selection device has been designed in the following fashion. A pickup cartridge with an inter-music sensor including a light source and a light receiving element is moved along the record disc so that an inter-music space is detected from the variation of the output of the inter-music sensor. The output of the inter-music sensor corresponds to the variation in intensity of light which is reflected from the surface of the record disc and is received by the light receiving element. When the number of inter-music spaces thus detected becomes equal to an address of the desired piece of music which has been externally specified, the pickup cartridge is stopped and then the pickup cartridge is lowered onto the record disc to play (reproduce) the latter. However, the pickup cartridge tends to move beyond a position where it should be stopped due to the mass of the arm or the characteristic of the drive section. That is, a so-called "over-shoot" phenomenon occurs. This stop position error due to the "over-shoot" phenomenon is minimized by driving the pickup arm in the opposite direction immediately when the pickup arm is stopped.

While the inter-music spaces are detected, the record is being turned. Therefore, if the record is eccentric or warped, the stylus of the pickup cartridge which is positioned right above the detected inter-music space may not be lowered onto the inter-music space. That is, the pickup cartridge might be displaced inwardly or outwardly relative to the inter-music space. If such a displacement occurs, the record is played from the end portion of the preceding piece of music or the middle portion of the desired piece of music. Thus, the conventional automatic music selection device has no suitable countermeasure against the eccentricity of the record disc. Theoretically, if the eccentricity is larger than the width of the inter-music space, it is impossible to correctly lower the pickup cartridge onto the aimed inter-music space.

In the case where a plurality of pieces of music preselected and programmed are automatically played in the programmed order, i.e., in the case where a record is played in a so-called "random music selection mode", it is necessary to detect the inter-music spaces while the record is being played (or traced). However, since the inter-music sensor is in proximity to the record surface during the record playing operation, the difference between the amount of light received from the modulated groove zone and the amount of light received from the inter-music space is much smaller than the difference during the "lead-in" operation or the "return" operation. This is due to the fact that the amount of light received from the modulated groove zone of the record increases during the record playing operation. Therefore, with the arrangement that an inter-music space is detected by using the output of a single inter-music sensor, it is considerably difficult to set the threshold level and accordingly the detection result is liable to be erroneous.

Furthermore, there is a record player provided with a muting circuit for muting a pickup output. The muting circuit is provided to suppress noise such as for instance an impact sound which is produced when the stylus of the pickup cartridge is lowered onto the record. The muting circuit is typically designed so that the muting control is released with the timing that after the stylus of the pickup cartridge has been lowered onto the record, the output of the single inter-music sensor provided in proximity to the stylus exceeds a threshold level corresponding, for instance, to a substantially central position on the inter-music space. However, with the arrangement that an inter-music space is detected by utilizing the output of a single inter-music sensor, it is considerably difficult to set a threshold level corresponding to a desired inter-music position, and accordingly erroneous operations are liable to occur. In addition, when the stylus lowering position is displaced, for instance, radially inwardly of the record due to the eccentricity of the record, the muting control cannot be released.

SUMMARY OF THE INVENTION

Accordingly, a primary object of this invention is to provide a pickup arm drive device with which the stylus of a pickup cartridge can be correctly lowered onto an aimed inter-music space even if a record disc involves an eccentricity or warp.

Another object of this invention is to provide a pickup arm drive device with which the inter-music spaces can be positively detected and the pickup arm is driven in accordance with the detection of the inter-music spaces even during the playing (tracing) condition of the record.

Still another object of this invention is to provide an automatic music selecting device for a record player which can correctly lower the stylus of the pickup cartridge onto the aimed inter-music space even if the record disc is eccentric or warped, and can positively release the muting control at a desired inter-music position.

The pickup arm drive device in accordance with this invention includes: first and second inter-music sensors arranged near a stylus on a pickup arm for detecting an inter-music space on a record disc; a first calculating circuit for subjecting outputs of the first and second inter-music sensors to calculation; a second calculating circuit for subjecting a predetermined reference voltage and an output of the first calculating circuit to calculation; a signal generating circuit for generating a detection signal when an output of the first or second calculating circuit changes initially to exceed a predetermined level; and a control circuit for performing control operations to drive the pickup arm to an inter-music position specified in advance and to drive the pickup arm at the inter-music position according to an output of the second calculating circuit, the first and second inter-music sensors being arranged in such a manner that one of the first and second inter-music sensors is ahead of the other when the pickup arm is moved. The drive control of the pickup arm at the inter-music position by the control circuit is started in response to the detection signal. In automatically selecting a desired music on a record disc on which a plurality of pieces of music are recorded, an automatic music selecting device using the pickup arm drive device of this invention further includes a muting circuit for muting a pickup output, the muting operation of which is released in response to the output obtained by processing the outputs of the two sensors.

BRIEF DESCRIPTION OF THE DRAWINGS

Preferred embodiments of this invention will be described with reference to the accompanying drawings, in which:

FIG. 3A is a graphical representation showing the output characteristics of the inter-music sensors at the inter-music space, FIGS. 3B and 3C are graphical representations showing processed outputs of the sensor outputs and FIG. 3D is a cross-sectional view of the record disc;

DETAILED DESCRIPTION OF THE PREFERRED EMBODIMENTS

Figures 1, 2A, 2B:
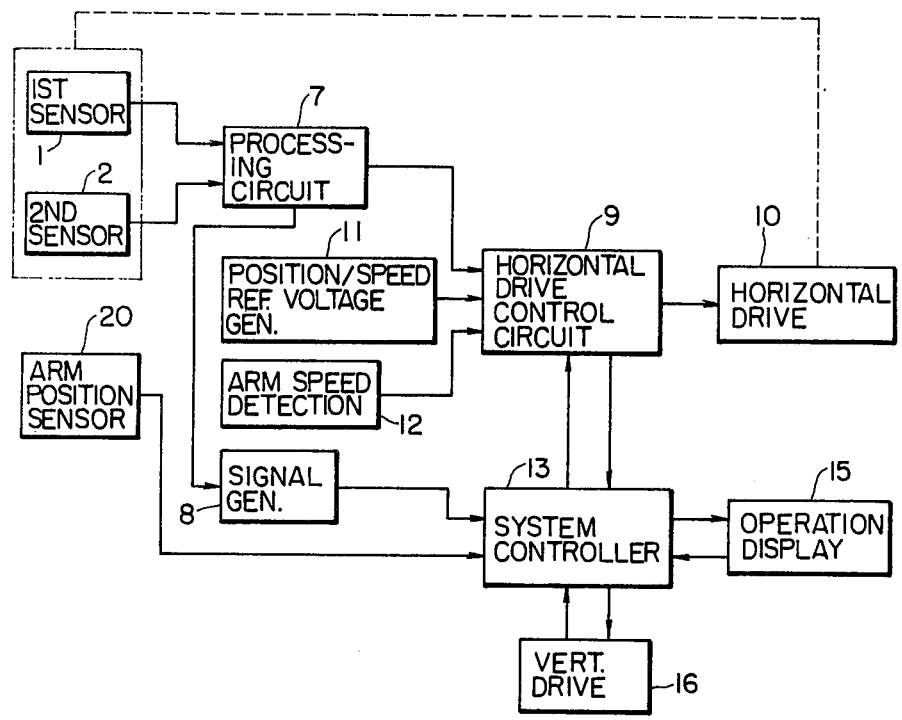
FIG. 1 is a block diagram showing a first embodiment of this invention.
FIG. 2A is a perspective view showing a pickup cartridge and FIG. 2B is an explanatory diagram showing the positional relationship between inter-music sensors and an inter-music space on a record disc.

FIG. 1 is a block diagram showing a first embodiment of the invention. In FIG. 1, reference numerals 1 and 2 designate first and second inter-music detecting means (hereinafter referred to as "first and second inter-music sensors 1 and 2") which are arranged near the stylus of a pickup arm (not shown) in order to detect an inter-music space on a record disc (at least two inter-music sensors being provided). The inter-music sensors are provided at the end portion of a pickup cartridge 3 as shown in FIG. 2A. The first and second inter-music sensors 1 and 2 include: a common light source which is a single light source 5, such as a light emitting diode disposed in a vertical plane including a stylus 4 of the cartridge 3; and two light receiving elements 6a and 6b, such as photo-transistors arranged in the direction of swing (or motion) of the pickup arm in such a manner that they are symmetrical with respect to the vertical plane including the light source 5. The first and second inter-music sensors 1 and 2 may have individual light sources, respectively.

When the pickup arm is swung (or moved) in the "lead-in" direction, the light receiving element 6a of the first inter-music sensor 1, being ahead of the light receiving element 6b of the second inter-music sensor 2, receives light emitted from the light source 5 and the light is reflected upon record disc 21. The light receiving element 6a produces an output corresponding to the quantity of light thus received, as shown in FIG. 2B. On the other hand, when the pickup arm is swung (or moved) in the "return" direction, the light receiving element 6b, being ahead of the light receiving element 6a, receives light emitted from the light source 5 and the light is reflected upon the record disc 21. The light receiving element 6b produces an output corresponding to the quantity of light thus received, similar to the above-described counterpart light receiving element 6a. More specifically, while moving over the inter-music space 21a on the record disc 21, the first and second light receiving elements 6a and 6b produce outputs as indicated by the curves (a) and (b) in FIG. 3A, respectively. When the stylus 4 of the cartridge 3, i.e., the center of the distance between the sensors 1 and 2, comes above the center of the inter-music space 21a, the relationships of the curves (a) and (b) with respect to the center of the inter-music space (hereinafter referred to as "an inter-music space center") are as shown in FIG. 3A. The outputs of the first and second light receiving elements 6a and 6b are applied through a processing circuit 7 to a signal generating circuit 8.

Figure 4:
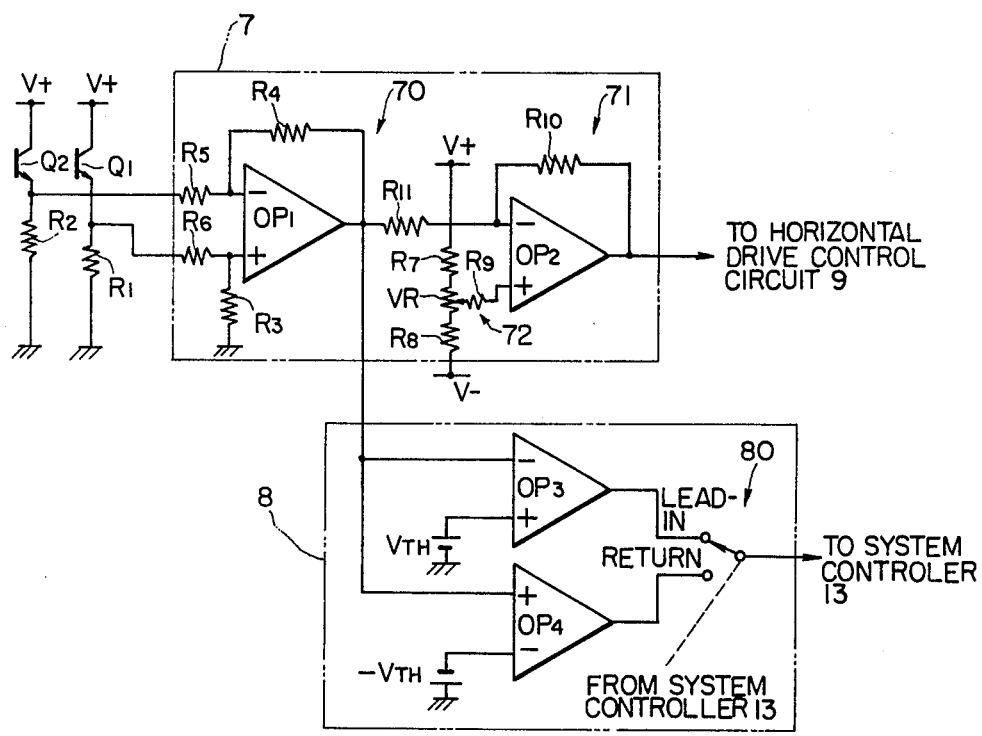
FIG. 4 is a circuit diagram showing one example of the inter-music sensors, processing circuit and signal generating circuit applied to the first embodiment shown in FIG. 1.

FIG. 4 is a circuit diagram showing one example of the processing circuit 7 and signal generating circuit 8. As shown in FIG. 4, photo-transistors $Q_1$ and $Q_2$, which are the light receiving elements of the first and second inter-music sensors 1 and 2, are connected between a positive electric source $+V$ and ground through resistors $R_1$ and $R_2$, respectively. The emitter outputs of the photo-transistors $Q_1$ and $Q_2$ are supplied to a first operational circuit 70 of a subtraction circuit arrangement. The first operational circuit 70 includes: an operational amplifier $OP_1$ whose non-inverting input terminal is grounded through a resistor $R_3$; a feedback resistor $R_4$ connected between the inverting input terminal and the output terminal of the operational amplifier $OP_1$; and resistors $R_5$ and $R_6$ connected to the inverting and non-inverting input terminals of the operational amplifier $OP_1$, respectively. By subtracting the output (b) of the second inter-music sensor 2 from the output (a) of the first inter-music sensor 1 (shown in FIG. 3A), a subtraction output as indicated in FIG. 3B is obtained. The subtraction output is applied to a difference signal generating circuit 71 as a second operational circuit. The operational circuit 70 may be formed so as to perform addition or multiplication instead of subtraction. However, it is preferable that the operational circuit 70 is arranged to perform subtraction as described above, because the same phase noises attributed to external disturbance light equally incident to both sensors and sensor output shift components (DC components) attributing to a steady reflection condition, such as the reflection factor of a record disc, are cancelled out. Therefore, the difference output provided is the same as that provided when no external disturbance light exists.

The difference signal generating circuit 71 includes: a reference voltage generating circuit 72 having a resistor $R_7$, a variable resistor VR and a resistor $R_8$ series-connected between the positive electric source $+V$ and a negative electric source $-V$; an operational amplifier $OP_2$ whose non-inverting input terminal is connected through a resistor $R_9$ to the movable tap of the variable resistor VR; a feedback resistor $R_{10}$ connected between the inverting input terminal and the output terminal of the operational amplifier $OP_2$; and a resistor $R_{11}$ connected to the inverting input terminal of the operational amplifier $OP_2$. The subtraction output (FIG. 3B) applied to the difference signal generating circuit 71 has a zero-cross-point P corresponding to a stylus lowering position. According to the difference between the subtraction output and a reference voltage $V_{ref}$ which is set in correspondence to a position in the range X (FIG. 3B) by the reference voltage generating circuit 72, a horizontal drive control circuit (to be described later) controls the stylus lowering position at the inter-music position on the record disc. That is, the stylus lowering position can be adjusted by changing the reference voltage $V_{ref}$. For instance, if the reference voltage $V_{ref}$ is set to the lower limit level in FIG. 3A, i.e., to zero, then the stylus lowering reference position comes to the center of the inter-music space. The stylus lowering reference position may be adjusted by shifting the subtraction output level with the reference voltage $V_{ref}$ fixed.

The signal generating circuit 8 is to produce a detection signal when the output of the operational circuit 70 initially exceeds a predetermined level. The signal generating circuit 8 includes: a first comparison circuit, i.e., an operational amplifier $OP_3$ which receives the output of the operational circuit 70 at the inverting input terminal and a first reference voltage $V_{TH}$ at the non-inverting input terminal; a second comparison circuit, i.e., an operational amplifier $OP_4$ which receives the output of the operational circuit 70 at the non-inverting input terminal and a second reference voltage $-V_{TH}$ at the inverting input terminal, the second reference voltage $-V_{TH}$ being opposite in polarity but equal in absolute value to the first reference voltage; and a change-over switch 80 which is operated by a system controller 13 (to be described later) selectively according to the "lead-in" operation and the "return" operation, so as to selectively introduce the outputs of the operational amplifiers $OP_3$ and $OP_4$ to the system controller 13.

Figure 5A:
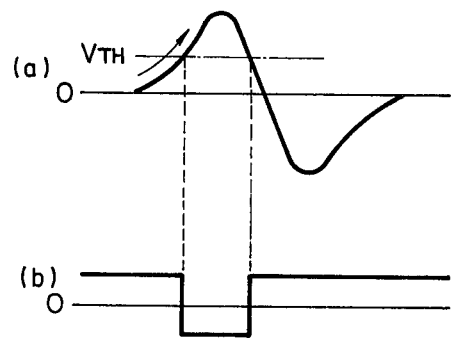
FIGS. 5A and 5B are waveform diagrams for description of the operation of the signal generating circuit shown in FIG. 4.
Figure 5B:
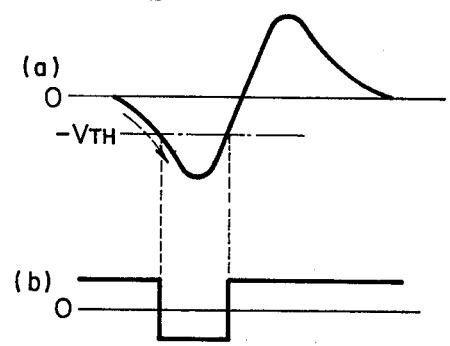

In the "lead-in" operation, when the output (a) of the operational circuit 70 changes initially as indicated by the solid line in FIG. 5A to exceed the reference voltage $V_{TH}$, the operational amplifier $OP_3$ outputs a low level detection signal (b) which is applied through the change-over switch 80 to the system controller 13. In the "return" operation, on the other hand, when the output (a) of the operational circuit 70 changes initially as indicated by the broken line in FIG. 5B to fall below the reference voltage $-V_{TH}$, the operational amplifier $OP_4$ outputs a low level detection signal (b) which is supplied through the switch 80 to the system controller 13. With the timing that the output of the operational circuit 70 changes initially to exceed the reference voltage $V_{TH}$ or to fall below the reference voltage $-V_{TH}$, i.e. with the timing of the falling edges of the detection signals (b), the system controller 13 detects that the stylus of the pickup arm is in the vicinity of the inter-music space, so that the "lead-in" operation or the "return" operation is switched over to an inter-space position servo operation to be described later.

The signal generating circuit 8 may be designed to produce the detection signal according to the output of the difference signal generating circuit 71. In this case, the first and second reference voltages are set according to the reference voltage $V_{ref}$ in the difference signal generating circuit 71 so that the timing of generation of the inter-music space detection signal in the "lead-in" operation is coincident with the timiing of generation of the inter-music space detection signal in the "return" operation.

Referring back to FIG. 1, reference numeral 9 designates the aforementioned horizontal drive control circuit for controlling the horizontal swing of the pickup arm. When the stylus is positioned above the inter-music space of the record, the horizontal drive control circuit 9 controls a horizontal drive section 10 to drive the pickup arm in accordance with the output of the processing circuit 7, to thereby control the stylus lowering position. In the "lead-in" or "return" operation, the control circuit 9 controls the horizontal drive section 10 to control the direction of swing (or motion) and the speed of the pickup arm in accordance with the outputs of a position/speed reference voltage generating section 11 and an arm speed detecting section 12. The drive timing of the control circuit 9 is controlled by a control signal fed from the system controller 13.

Figure 6:
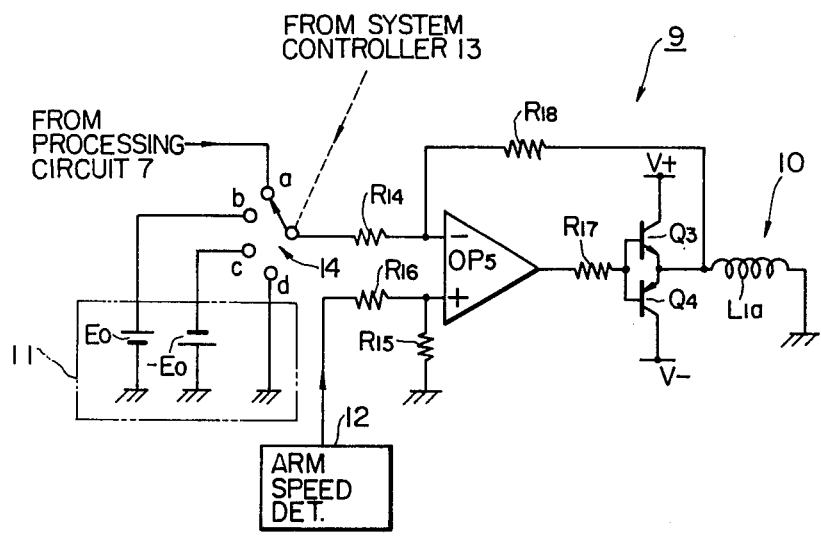
FIG. 6 is a circuit diagram showing one example of a horizontal drive control circuit.

FIG. 6 is a circuit diagram showing one example of the horizontal drive control circuit 9, including the horizontal drive section 10, the position/speed reference voltage generating section 11 and the arm speed detecting section 12. In FIG. 6, reference numeral 14 designates a mode change-over switch by which four modes, i.e. an inter-music position servo mode, a lead-in mode, a return mode and a stop mode, can be selected. The output of the processing circuit 7 is applied to a terminal corresponding to the inter-music position servo mode. The position/speed reference voltage generating section 11 applies a reference constant voltage $E_0$, a reference constant voltage $-E_0$ and ground potential to terminals b, c and d corresponding to the lead-in, return and stop modes, respectively. The mode change-over switch 14 operates to switch between these modes in response to the control signals fed from the system controller 13.

The output of the mode change-over switch 14 is applied through a resistor $R_{14}$ to the inverting input terminal of an operational amplifier $OP_5$. The output of the arm speed detecting section 12 is applied through a resistor $R_{16}$ to the non-inverting input terminal of the operational amplifier $OP_5$, which is grounded through a resistor $R_{15}$. The output of the operational amplifier $OP_5$ is applied through a resistor $R_{17}$ to the connecting point of the bases of transistors $Q_3$ and $Q_4$ connected in pushpull configuration between the positive and negative electric sources $+V$ and $-V$. The connecting point of the emitters of the transistors $Q_3$ and $Q_4$ is grounded through a drive coil $L_{1a}$ which forms the horizontal drive section 10. The drive coil $L_{1a}$ serves to drive the pickup arm in the direction and at the speed in accordance with the polarity and magnitude of the emitter output. A feed-back resistor $R_{18}$ is connected between the connecting point of the emitters and the inverting input terminal of the operational amplifier $OP_5$.

In a music selection operation, the system controller 13 stores music number data specified by an operational display section in advance and operates the mode change-over switch 14 in the horizontal drive control circuit 9 to select the lead-in mode in response to a start instruction signal, to thereby start the lead-in operation. The system controller counts the number of pieces of music in response to the falling edges of the detection signal (b) shown in FIG. 5A produced by the operational amplifier $OP_3$. When the controller 13 has counted the number of pieces of music specified in advance, the controller 13 operates the mode change-over switch 14 to select the inter-music servo mode with the timing of the relevant falling edge of the detection signal, so that the lead-in operation is shifted to the control operation of the stylus lowering position at the inter-music position, and to drive an arm vertical drive section 16 to lower the pickup arm. In the return operation, the return mode is shifted to the inter-music servo mode with the timing of the relevant falling edge of the detection signal (b) shown in FIG. 5B produced by the operational amplifier $OP_4$.

Figure 7A:
FIGS. 7A and 7B are waveform diagrams showing sensor output and processed output, respectively.
Figure 7B:
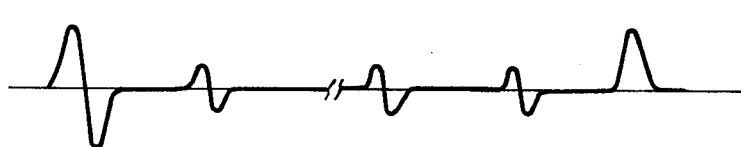
Figure 7C:
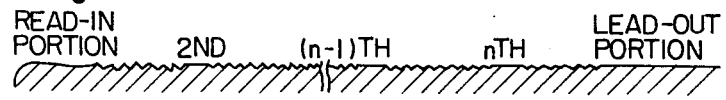
FIG. 7C is a cross-sectional view of the record disc on the surface of which the sensors scan.

In the inter-music position servo mode, since the reference level of the operational amplifier $OP_5$ in the horizontal drive control circuit 9 is at ground level, the pickup arm is driven so that the difference between the reference voltage $V_{ref}$ and the output of the processing circuit 7, which is obtained by processing the outputs of the sensors 1 and 2, is zero, whereby the stylus 4 is lowered to an inter-music position corresponding to the reference voltage $V_{ref}$. In other words, even if the stylus 4 is displaced relative to the inter-music position on the record disc by an external force exerted on the pickup arm or the eccentricity of the record, the pickup arm is driven in accordance with the difference voltage from the reference voltage $V_{ref}$, which is obtained when the waveform in FIG. 3B is shifted right or left as much as the amount of displacement mentioned above. Thus, the stylus 4 is held at the position corresponding to the reference voltage $V_{ref}$. The stylus lowering reference position is set at the center of the inter-music space by setting the reference voltage $V_{ref}$ to zero, as described before. If the reference voltage $V_{ref}$ is set to $+V_0$ for instance, then the comparison output (which is the output of $OP_2$) level is shifted by $+V_0$ from the processed output (FIG. 3B) as shown in FIG. 3C. Since the reference level of the operational amplifier $OP_5$ in the horizontal drive control circuit 9 is at the ground, the stylus lowering reference position corresponds to the zero-cross-point Q in the FIG. 3C, and the inter-music position servo operation is carried out about the position which corresponds to the zero-cross-point Q. That is, the stylus lowering reference position can be finely adjusted by controlling the reference voltage $V_{ref}$. It can be readily understood that the same effect is obtained by shifting the comparison output level. FIGS. 7A and 7B show the sensor outputs and the processed output, respectively, which are obtained when the inter-music sensors 1 and 2 scan the entire record disc continuously. FIG. 7C is a cross-sectional view of the record disc on the surface of which the inter-music sensors 1 and 2 scan.

As is apparent from the above description, with the pickup arm drive device according to the first embodiment of this invention, the stylus of the pickup arm can be lowered exactly to the inter-music space on the record disc even if the record has an eccentricity or a warp. Furthermore, the two inter-music sensors are so arranged that one of the sensors is ahead of the other when the pickup arm is moved, and with the timing that the processed output obtained by processing the outputs of the two sensors exceeds the predetermined level the control is switched for the inter-music position servo operation. Therefore, the music selecting operation and the inter-music position servo operation in the "lead-in" direction and in the "return" direction can be carried out under the same condition. Thus, in an automatic music selection player, the reproduction can start from the "lead-in" portion of a desired piece of music.

Figure 8:
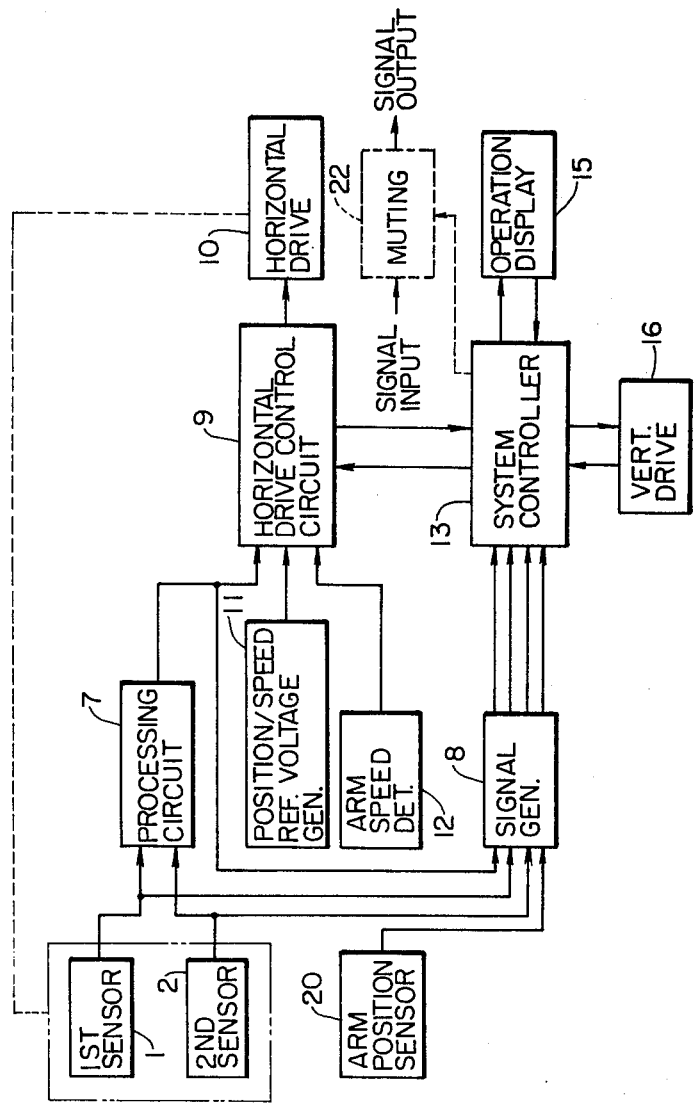
FIG. 8 is a block diagram showing a second embodiment of this invention.
Figure 9:
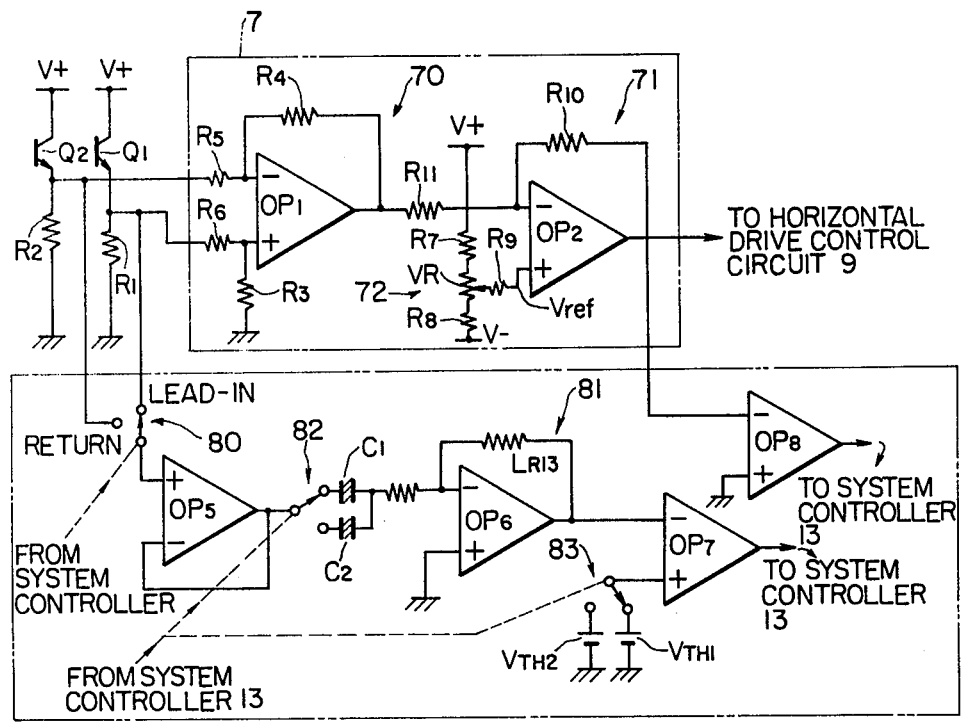
FIG. 9 is a circuit diagram showing one example of the inter-music sensors, processing circuit and signal generating circuit applied to the second embodiment of this invention shown in FIG. 8.

FIG. 8 is a block diagram showing the second embodiment of this invention and FIG. 9 is a circuit diagram showing one example of the processing circuit 7 and signal generating circuit 8 shown in FIG. 8. Like numerals or characters in FIGS. 8 and 9 designate like components or elements shown in FIGS. 1 and 4. Since the processing circuit 7 shown in FIG. 9 is identically arranged to the one shown in FIG. 4, description will not be repeated herein.

In FIG. 9, the signal generating circuit 8 operates to produce a first signal in accordance with the output of either one of the first and second inter-music sensors 1 and 2, and to produce a second signal in accordance with the output of the processing circuit 7. The signal generating circuit 8 includes: a change-over switch 80 which is operated by a system controller 13 in the "lead-in" operation or in the "return" operation in order to select either of the outputs of the inter-music sensor 1 or 2; an AC amplifier 81 having operational amplifiers $OP_5$ and $OP_6$, resistors $R_{19}$ and $R_{20}$ and capacitors $C_1$ and $C_2$; a first comparison circuit, namely, an operational amplifier $OP_7$ which receives the output of the AC amplifier 81 at its inverting input terminal and receives a second reference voltage $V_{TH1}$ or $V_{TH2}$ at its non-inverting input terminal; and a second comparison circuit, namely, an operational amplifier $OP_8$ which receives the output of the difference signal generating circuit 71 at its inverting input terminal and receives a third reference voltage of the ground level at its non-inverting input terminal.

The output levels of the inter-music sensors 1 and 2 obtained when the pickup arm is at an elevated position (i.e., it is under the "lead-in" or "return" operation) are different from those of the sensors 1 and 2 obtained when the pickup arm traces the record. In view of this fact, the signal generating circuit 8 further includes: change-over switches 82 and 83 which select the capacitor $C_1$ or $C_2$ and the reference voltage $V_{TH1}$ or $V_{TH2}$ depending upon the elevated position or tracing condition of the pickup arm. These switches are operated in response to an arm down detection signal fed from the system controller. By selecting the capacitor $C_1$ or $C_2$, the gradient of the waveform of the sensor output which is applied to the inverting input of the operational amplifier $OP_7$ in the case where the pickup arm is maintained elevated can be made substantially coincident with the gradient of the waveform of the sensor output in the case where the pickup arm traces the record. Furthermore, by selecting the reference voltage $V_{TH1}$ or $V_{TH2}$, the output generation timings in the operational amplifier OP$_7$ in the case where the pickup arm is maintained elevated and is in the tracing operation can be made substantially coincident with each other.

The aforementioned arm down detection signal is provided by the system controller according to the output of a detecting coil $L_{2b}$ (described later with reference to FIG. 16) for detecting the swinging speed of the pickup arm in a vertical plane produced when the pickup arm descends to the record and the swing of the pickup arm is stopped. In the "lead-in" or "return" operation, the operational amplifier OP$_7$ outputs the first signal, namely, a low level inter-music signal (b) (FIG. 10) for the period of time for which the output (a) (FIG. 10) of the inter-music sensor 1 or 2 exceeds the reference voltage $V_{TH1}$, i.e. the inter-music sensor 1 or 2 detects an inter-music space.

Figure 11:
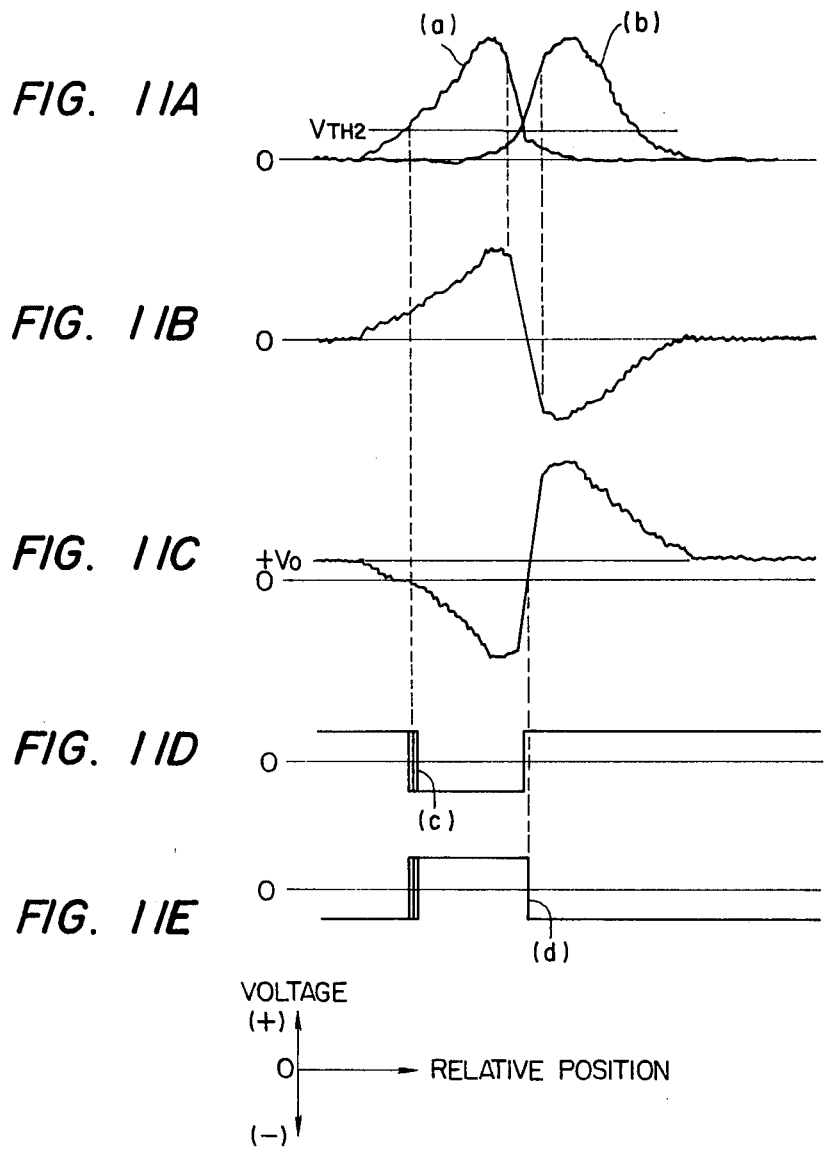
FIGS. 11A through 11E are waveform diagrams for description of the inter-music detection operation in a record tracing operation.

Next, the inter-music space detection during the record tracing operation will be described with reference to a waveform diagram shown in FIGS. 11A through 11E. The feed pitch of the inter-music space is larger than that of the record groove. Therefore, when the pickup cartridge stylus goes across an inter-music space while tracing the record, the outputs (a) and (b) of the inter-music sensors 1 and 2 change abruptly, as shown in FIG. 11A. The outputs (a) and (b) of the inter-music sensors 1 and 2 are subjected to calculation in the operational circuit 70 (FIG. 9), and the latter 70 provides an output having a waveform as shown in FIG. 11B. The timing when the steep part of the output waveform goes across the reference level corresponds to the time instant when the middle point between the light metering fields of the inter-music sensors 1 and 2 is positioned at the center of the inter-music space. The output of the operational circuit 70 is applied to the difference signal generating circuit 71 where it is shifted, for instance, as much as $V_0$ by the reference voltage $V_{ref}$, and is outputted as a difference signal.

The output (a) of the inter-music sensor 1, which goes ahead in playing a record, is compared with the second reference voltage $V_{TH2}$ in the operational amplifier OP$_7$, as a result of which it is outputted as a low level inter-music signal (or the first signal) as shown in FIG. 11D when the sensor 1 comes to an inter-music space. On the other hand, the output of the difference signal generating circuit 71 as shown in FIG. 11C is compared with the ground level in the operational amplifier OP$_8$, so that it is outputted as a low level inter-music space center detection signal (or the second signal) as shown in FIG. 11E when the middle point between the light metering fields of the inter-music sensors 1 and 2 reaches the middle point in the inter-music space. The inter-music signal and the inter-music space center detection signal are supplied to the system controller 13.

After confirming from the falling edge (e) of the inter-music signal (FIG. 11D) that the middle point between the light metering fields of the inter-music sensors 1 and 2 enters into the inter-music space detection range, the system controller 13 detects from the falling edge (d) of the inter-music space center detection signal (FIG. 11E) that the middle point between the light metering fields is positioned at the middle point of the inter-music space. The timing of the falling edge (d) is employed as the timing of an inter-music space detection in the record tracing operation. With this detection timing, the system controller 13 operates to elevate the pickup arm and to carry out the succeeding instructional operations. In the case of a random music selection in which the second and third pieces of music are selected and programmed, for instance, the pickup arm is not elevated when the pickup arm reaches the inter-music space immediately after the second piece of music has been played, so that the third piece of music is reproduced in succession.

It can be readily understood that the above-described inter-music detection signal and inter-music space center detection signal can be utilized to detect an inter-music space not only in the record tracing operation but also when the pickup arm is maintained elevated. By changing $V_0$ (which is the reference voltage $V_{ref}$) shown in FIG. 11C, the position of the middle point between the light metering fields over the inter-music space can be equivalently displaced radially outwardly or inwardly relative to the center of the inter-music space. This is particularly effective in electrically correcting the amount of mechanical displacement between the middle point of the metering fields and the pickup arm stylus in the arrangement in which the middle point and the stylus should be in alignment with each other.

Figure 12:
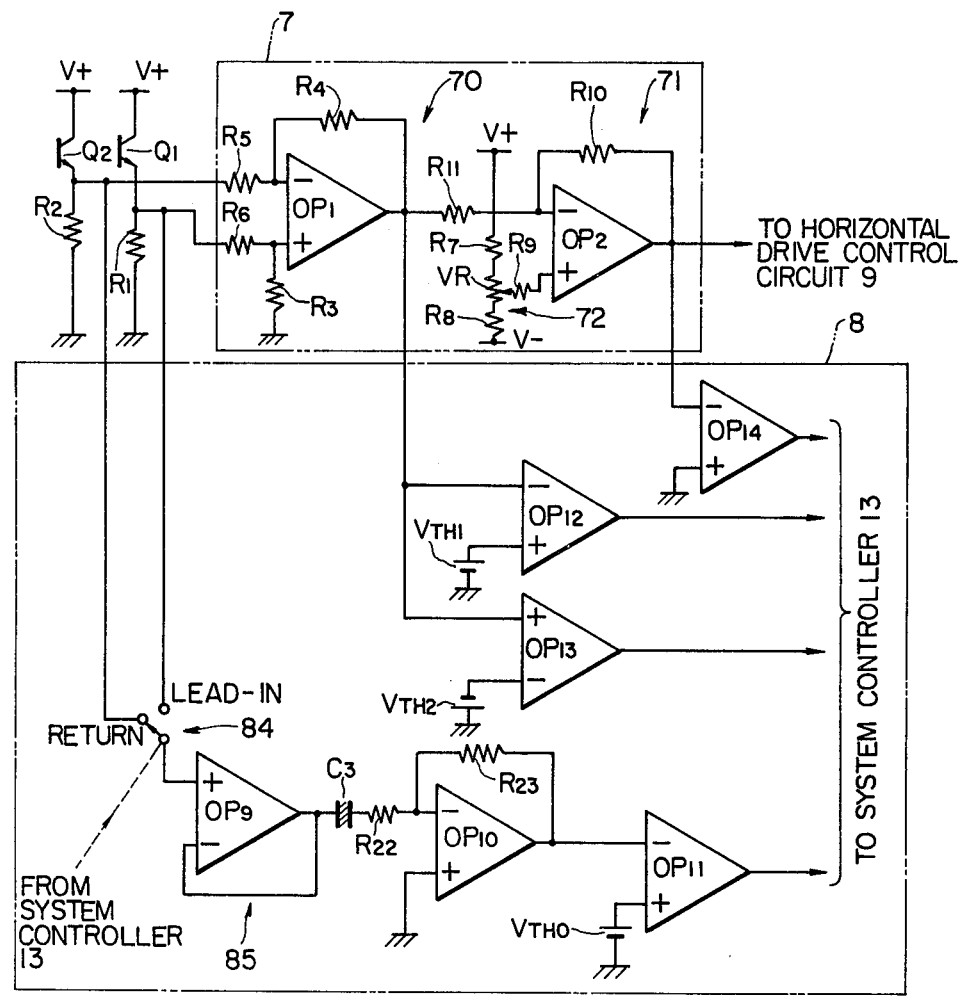
FIG. 12 is a circuit diagram showing another example of the inter-music sensors, processing circuit and signal generating circuit applied to the second embodiment of this invention shown in FIG. 8.

FIG. 12 is a circuit diagram showing another example of the processing circuit 7 and the signal generating circuit 8 according to the second embodiment of this invention. Like numerals or characters in FIG. 12 designate like components or elements shown in FIG. 9. Since the processing circuit 7 shown in FIG. 12 is identically arranged to the one shown in FIGS. 4 and 9, description thereof is omitted herein.

Figure 10:
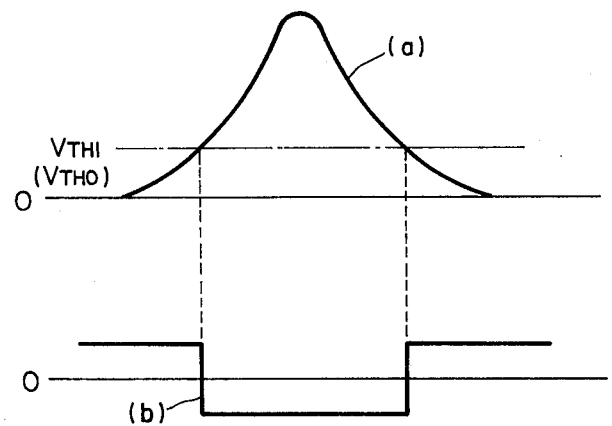
FIG. 10 is a waveform diagram for a description of the operation of the signal generating circuit shown in FIG. 9.

In FIG. 12, the signal generating circuit 8 operates to produce an inter-music signal according to the output of either one of the inter-music sensors 1 and 2 when the pickup arm is maintained elevated (in the "lead-in" operation or in the "return" operation), and to detect a first variation of the output of the processing circuit 7, to thereby produce a first detection signal and produce a second detection signal when the output of the processing circuit 7 makes a second variation to exceed a predetermined level in the record tracing (playing) operation. The signal generating circuit includes: a change-over switch 84 operated by a system controller in the "lead-in" operation or in the "return" operation to select either one of the outputs of the inter-music sensors 1 and 2; an AC amplifier 85 including operational amplifiers OP$_9$ and OP$_{10}$, resistors $R_{22}$ and $R_{23}$ and a capacitor $C_3$; an operational amplifier OP$_{11}$ which receives the output of the AC amplifier 85 at its inverting input terminal and a reference voltage $V_{TH0}$ at its non-inverting input terminal; an operational amplifier OP$_{12}$ which receives the output of the operational circuit 70 at its inverting input terminal and a second reference voltage $V_{TH1}$ at its non-inverting input terminal; an operational amplifier OP$_{13}$ which receives the output of the operational circuit 70 at its non-inverting input terminal and a third reference voltage $V_{TH2}$ at its inverting input terminal, the operational amplifiers OP$_{12}$ and OP$_{13}$ forming a first comparison circuit; and a second comparison circuit constituted with an operational amplifier OP$_{14}$ which receives the output of the difference signal generating circuit 71 at its inverting input terminal and a fourth reference voltage at the ground level at its non-inverting input terminal. In the "lead-in" or "return" operation, the operational amplifier OP$_{11}$ outputs a low level inter-music signal (b) as shown in FIG. 10 while the output (a) (FIG. 10) of the inter-music sensor 1 or 2 exceeds the reference voltage $V_{TH0}$, i.e., while the inter-music sensor 1 or 2 detects an inter-music space.

Figure 13:
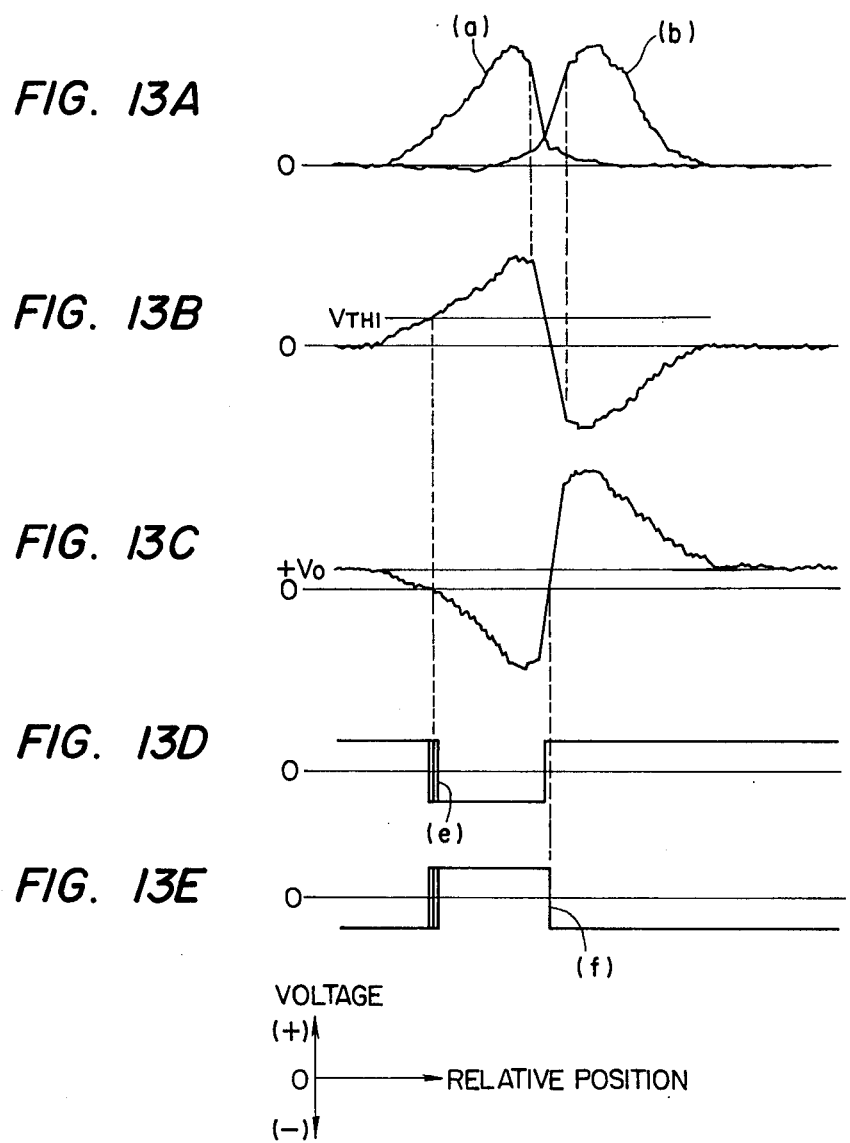
FIGS. 13A through 13E are waveform diagrams for description of the inter-music detection operation in the record tracing operation.

The inter-music space detection during the record tracing operation will next be described. In the difference signal waveform diagram shown in FIG. 3C, the left-hand side slope indicated by the solid line arrow is the first variation, and the steep slope in the mid-portion of the graph is the second variation. The output of the operational circuit 70 is applied to the inverting input terminal of the operational amplifier OP$_{12}$ and to the non-inverting input terminal of the operational amplifier OP$_{13}$, as shown in FIG. 12. The operational amplifiers OP$_{12}$ and OP$_{13}$ form the first comparison circuit as described before. When the output of the operational circuit 70 reaches the reference voltage V$_{TH1}$, the operational amplifier OP$_{12}$ detects the above-described first variation and outputs a first low level detection signal as shown in FIG. 13D. When the difference signal as shown in FIG. 13C of the difference signal generating circuit 71 goes across the reference level (the ground level), the operational amplifier OP$_{14}$ receiving the difference signal as shown in FIG. 13C at its inverting input terminal detects the aforementioned second variation and outputs a second low level detection signal as shown in FIG. 13E. The first and second detection signals are supplied to the system controller 13.

After confirming from the falling edge (e) of the first detection signal shown in FIG. 13D that the middle point between the light metering fields of the inter-music sensors 1 and 2 enters into the inter-music space detection range, the system controller 13 detects the second variation both in the "lead-in" and "return" operations. When the calculation output of the operational amplifier OP$_1$ reaches the reference voltage V$_{TH1}$ (or V$_{TH2}$), the operational amplifier OP$_{12}$ (or OP$_{13}$) detects the first variation in the "lead-in" (or "return") operation to output the first detection signal. When the difference signal goes across the ground level, the operational amplifier OP$_{14}$ detects the second variation to output the second detection signal (FIG. 13E) whose level is set low in the "lead-in" operation and high in the "return" operation. Thus, the system controller 13 can detect an inter-music space according to the first and second detection signals both in the "lead-in" and "return" operations.

By changing V$_0$ (which is the reference voltage V$_{ref}$) in FIG. 13C, the position of the middle point between the light metering fields over the inter-music space can be equivalently displaced radially outwardly or inwardly of the center of the inter-music space, similar to the example shown in FIG. 9.

As is apparent from the above description, even if a record is eccentric or warped, the pickup arm cartridge stylus can be lowered correctly onto the inter-music space on the record. Furthermore, in playing a record with the inter-music sensors 1 and 2 being set adjacent to the record, an inter-music space can be positively detected by from the processed output, which is obtained by processing the outputs of the inter-music sensors 1 and 2, that the middle point between the light metering fields of the sensors 1 and 2 is positioned at the center of the inter-music space after it has been confirmed from the output of one of the sensors 1 and 2 or from the detection of the first variation of the calculation output obtained from the outputs of the inter-music sensors 1 and 2 that the middle point between the light metering fields has entered into the inter-music space detection range. In other words, since the processed outputs in the case where the pickup arm is maintained elevated (in the "lead-in" operation or in the "return" operation) and in the case where a record is being played are substantially equal in waveform, the inter-music space can be correctly detected from the processed output obtained from the outputs of the two inter-music sensors. Thus, in the case where the record is played in the random music selection mode, the pickup arm is elevated in response to the detection of the inter-music space which occurs immediately after a piece of music has been played (except for the case where pieces of music are selected in succession) and the next specified operation is conducted, so that a plurality of pieces of music programmed in advance can be played positively in the programmed order beginning from the top of each piece of music.

Figure 14:
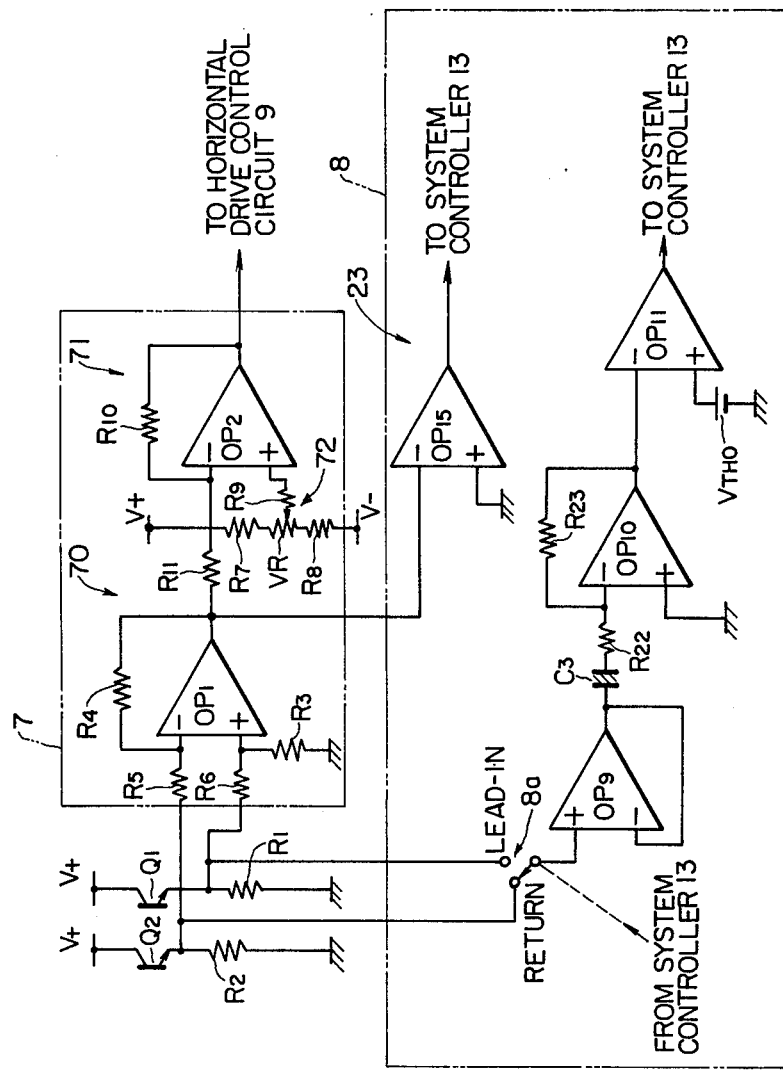
FIG. 14 is a circuit diagram showing still another example of the inter-music sensors, processing circuit and signal generating circuit applied to the second embodiment of this invention shown in FIG. 8.

FIG. 14 is a circuit diagram showing still another example of the processing circuit 7 and the signal generating circuit 8 according to the second embodiment of this invention. Like reference numerals or characters in FIG. 12 designate like components or elements shown in FIG. 14. Since the processing circuit 7 and a part of the signal generating circuit 8 are identically arranged to those shown in FIG. 12, description thereof is omitted herein.

Referring back to FIG. 8, a muting circuit may be provided for muting (interrupting) a signal picked up by the pickup cartridge for a predetermined period of time. The muting circuit 22 is provided so that noise such as for instance an impact sound occurring when the cartridge stylus is lowered onto the record may not be reproduced through the loudspeaker. The muting circuit 22 is controlled by the system controller 13 in such a manner that in the "lead-in" operation, the muting operation is started when the pickup arm leaves the rest position and is terminated when the stylus being lowered onto the inter-music space on the record comes to the predetermined inter-music position. The muting operation of the muting circuit 22 is released in response to the output of a comparator 23 which is a third operational circuit in FIG. 14.

As shown in FIG. 14, the comparator 23 includes an operational amplifier OP$_{15}$ which receives the output of the circuit 70 at its inverting input terminal and a second reference voltage, for instance at the ground level, at its non-inverting input terminal. The operational amplifier OP$_{15}$ produces an inverted output with the timing that the calculation output of the operational circuit 70 goes across the ground level, i.e., with the timing that the stylus comes to a substantially central position on the inter-music space. The system controller 13 releases the muting operation of the muting circuit 22 in response to the production timing of the inverted output of the comparator 23. It can be readily understood that the muting operation releasing timing can be changed by changing the second reference voltage level. The same effect can be obtained by setting the second reference voltage to a suitable value with the output of the difference signal generating circuit 71 supplied to the inverting input terminal of the operational amplifier OP$_{18}$.

Since the reference level of the operational amplifier OP$_5$ (FIG. 6) at horizontal drive control circuit 9 is in the ground level, a position corresponding to the zero-cross-point Q in FIG. 3C which is displaced radially outwardly relative to the central position of the inter-music space as shown in FIG. 3D, is now the stylus lowering reference position. Thus, the intermusic position servo operation is carried out with respect to this position. That is, the stylus lowering reference position can be finely adjusted by controlling the reference voltage $V_{ref}$. It can be readily understood that the same effect is obtained by shifting the comparison output level.

Figure 15A:
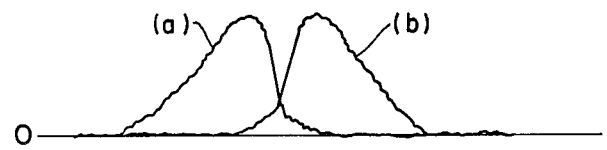
FIGS. 15A through 15D are waveform diagrams for a description of the operation carried out to release a muting operation.
Figure 15B:
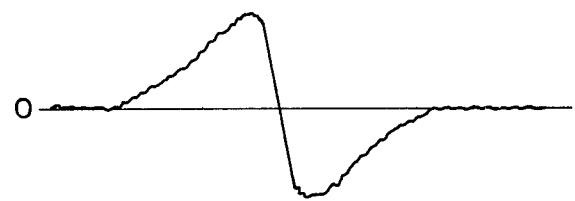
Figure 15C:
Figure 15D:
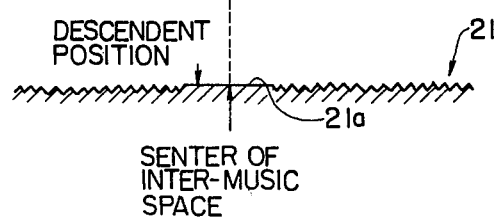

The stylus which has been lowered onto a position displaced radially outwardly of the inter-music space center starts tracing the groove of the record. An inter-music space feed pitch is larger than a groove pitch. Therefore, when the pickup cartridge stylus goes across an inter-music space while tracing the record, the outputs (a) and (b) of the inter-music sensors 1 and 2 change abruptly as shown in FIG. 15A. The outputs (a) and (b) of the inter-music sensors 1 and 2 are subjected to calculation in the operational circuit 70, and the output waveform of the latter is as shown in FIG. 15B. The output of the circuit 70 is applied, as a comparison input, to the comparator 23 (FIG. 14), which produces an output as shown in FIG. 15C. More specifically, the output of the comparator 23 is at a low level when the stylus is lowered onto the inter-music space, and is raised to a high level with the timing that the stylus comes to the substantially central position of the inter-music space and the calculation output (FIG. 15B) goes across the ground level. In response to this level inversion timing, the system controller 13 releases the muting operation of the muting circuit 22. Accordingly, an unpleasant sound, such as an impact sound which is caused when the stylus is lowered onto the record is never reproduced through the loudspeaker, and a desired piece of music is reproduced beginning from its top.

Referring back to the block diagram of FIG. 8, speed servo is applied to the pickup arm 17 (FIG. 16) according to the output of the arm speed detecting section 12. However, even if the arm speed detecting section 12 is not employed, the same control can be fundamentally achieved by exerting a mechanical braking force on the arm to drive the arm to the reference position and to hold it there. In this case, the arm can be driven by employing a suitable drive system, such as a continuous drive system or a pulse drive system. The automatic music selecting device constructed according to the invention is applicable to both a pickup arm of an offset arm arrangement and a pickup arm of a linear tracking arrangement. The first and second inter-music sensors can be employed not only to detect the inter-music spaces on the record disc but also to detect the sizes thereof.

As is apparent from the above description, according to the invention, the muting operation is released according to the output obtained by processing the outputs of the two inter-music sensors; that is, the muting operation is positively released at the predetermined inter-music position. Thus, the unpleasant or unwanted sounds attributing to the pickup arm system in the "lead-in" or "return" operation can be positively eliminated, and a desired piece of music can be reproduced exactly begining from its top.

Figure 16:
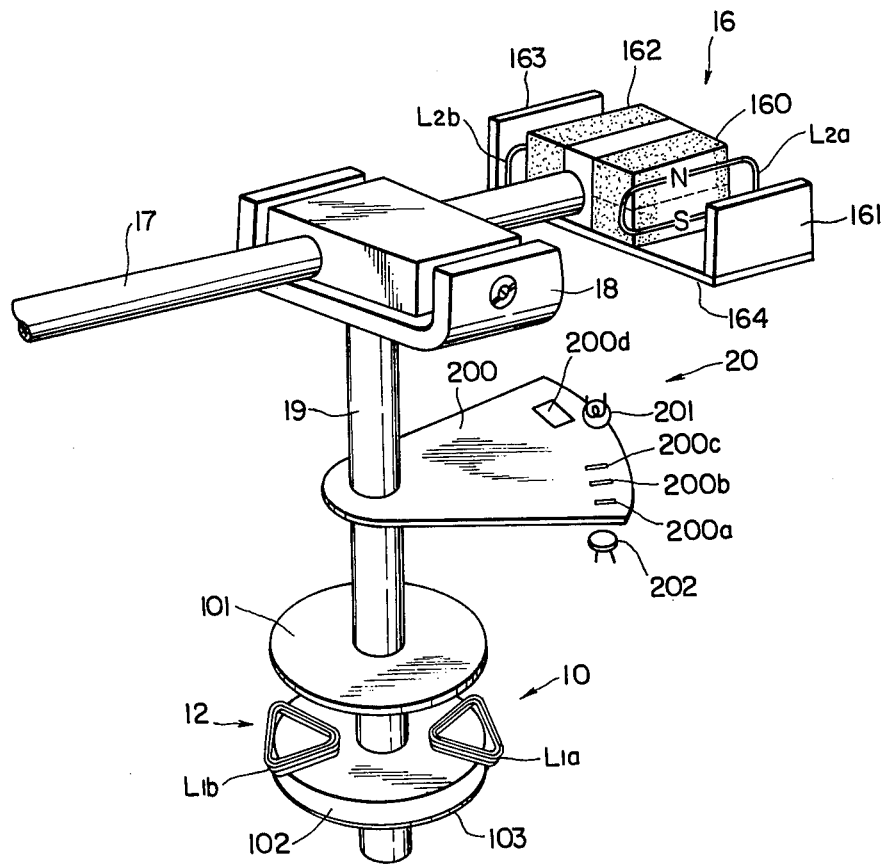
FIG. 16 is a perspective view showing the arrangement of one example of a pickup arm assembly.

FIG. 16 is a perspective view showing the arrangement of one example of an offset arm type pickup arm assembly. In FIG. 16, those components which are equivalent to those in FIGS. 1 or 8 are designated by like reference numerals or characters. In the pick-up arm assembly, the pickup arm is driven in horizontal and vertical planes directly by drive means including a so-called "linear motor". As shown in FIG. 16, the pickup arm 17 is held rotatably in a vertical plane by an arm holder 18 which is rotatable in a horizontal plane.

A horizontal drive section 10 operates to drive the pickup arm 17 in a horizontal plane. The horizontal drive section 10 includes: a yoke 101 secured to a horizontally rotatable shaft 19; a magnet 102 and a yoke 103 which are secured to the shaft 19 in such a manner that they confront the yoke 101 with a predetermined distance therebetween; and a drive coil $L_{1a}$ which is secured to the player body in such a manner that it is positioned between the yoke 101 and the magnet 102. Thus, the horizontal drive section 10 is of the moving magnet (MM) type, in which the magnet 102 is turned. It would be apparent that the horizontal drive section 10 may be of the moving coil (MC) type. The magnet 102 is magnetized in the widthwise direction so that different magnetic poles are arranged alternately along the circumference at a predetermined pitch. Thus, the magnet 102 and the drive coil $L_{1a}$, to which current corresponding to the output of the horizontal drive control circuit 9 is supplied, form a so-called "linear motor". A detection coil $L_{1b}$ is secured to the player body in such a manner that it is positioned between the yoke 101 and the magnet 102. The detection coil $L_{1b}$ and the magnet 102 form an arm speed detecting section 12 which is adapted to detect the speed of swing of the pickup arm in a horizontal plane. The arm speed detecting section 12 feeds back its detection output to the non-inverting input terminal of the operational amplifier $OP_5$, to control the speed of the pickup arm 17 to thereby attenuate the resonance of the pickup arm or vibration due to the eccentricity of the record disc.

In FIG. 16, reference numeral 16 designates a vertical drive section which operates to drive the pickup arm 17 in a vertical plane. The vertical drive section 16 includes: a magnet 160 secured to the rear end portion of the pickup arm 17; a yoke 161 secured through a support, which is preferably made of non-magnetic material, to the rear end portion of the pickup arm 17 in such a manner that it confronts the magnetic pole surface of the magnet 160 with a predetermined gap therebetween; and the drive coil $L_{2a}$ which is secured to the player body in such a manner that it is positioned in the gap between the magnet 160 and the yoke 161. Thus, the vertical drive section 16 is of the moving megnet (MM) type, in which the magnet 160 is turned. It would be apparent that the vertical drive section 16 may be of the moving coil (MC) type. The magnet 160 and the drive coil $L_{2a}$ form a so-called "linear motor". By controlling the direction and magnitude of a drive current applied to the drive coil $L_{2a}$, the elevation of the pickup arm and the stylus pressure can be controlled during the reproduction operation.

A magnet 162, a yoke 163 and a detection coil $L_{2b}$ are arranged similarly as in the vertical drive section, to form a speed detecting section which operates to detect the swinging speed of the pickup arm in a vertical plane. The detection output of the speed detecting section is fed back to the vertical drive section to control the speed of the pickup arm 17, to thereby suppress the resonance of the pickup arm 17 or vibration due to the warp of the record disc.

Further, in FIG. 16, reference numeral 20 designates an arm position sensor for detecting the position of the pickup arm 17 being swung. The arm position sensor 20 includes: a shutter secured to the horizontally rotatable shaft 19, and having slits 200a, 200b and 200c at reproduction start positions (or the lead-in portions of different size record discs) which are provided separately according to the different record sizes (30 cm, 25 cm and 17 cm) and a slit 200d corresponding to the lead-out groove zone of the record disc; and a light emitting element 201 and a light receiving element 202 which are disposed on both sides of the shutter 200 so that the element 202 can receive light from the element 201.

What is claimed is:

1. A pickup arm drive device in a record player provided with an automatic music selection device, said record player further including a pickup arm, a cartridge carried on said pickup arm and having a stylus, said pickup arm being movable with respect to a record disk in at least a swinging direction and said record player including means for lowering said pickup arm at a desired position, said drive device comprising:

at least one light source disposed in the vicinity of said stylus;

a first light receiving element disposed on said pickup cartridge for detecting light emitted from said light source and reflected by said record disk and providing an output;

a second light receiving element disposed on said pickup cartridge and offset with respect to said first light receiving element along said swinging direction, said second light receiving element receiving light emitted from said light source and reflected by said record disk, and providing an output;

subtraction means for subtracting the output of said first light receiving element from said output of said second light receiving element to provide a subtraction output; and servo means for effectuating servo control of said pickup arm during lowering of said pickup arm, said servo means comprising reference means (VR) for generating a reference signal having a predetermined reference value, means for comparing said reference signal and subtraction output to generate a servo control signal, and means responsive to said servo control signal for driving said pickup arm.

2. The device as claimed in claim 1 wherein said predetermined reference value is adjustable so that the descendent position of the stylus is controllable.

3. A pickup arm drive device for a record player of the type having an automatic music selection device, a pickup arm, a cartridge on said pickup arm and carrying a stylus, said pickup arm being movable with respect to a record disk in at least a swinging direction, said pickup arm drive device comprising:

at least one light source disposed in the vicinity of said stylus;

a first light receiving element disposed on said pickup cartridge for receiving light emitted from said light source and reflected by said record disk, and providing an output;

a second light receiving element disposed on said pickup cartridge and offset with respect to said first light receiving element in said swinging direction, said second light receiving element receiving light emitted from said light source and reflected by said record disk, and providing an output;

subtraction means for subtracting the outputs of said first and second light receiving elements to provide a subtraction signal; and means for halting the swinging movement of said pickup cartridge and for lowering said pickup cartridge when the absolute value of said subtraction signal falls below a predetermined value.

4. A pickup arm drive device for a record player of the type having an automatic music selection device, a pickup arm, a pickup cartridge disposed on said pickup arm and carrying a stylus, said pickup arm being movable with respect to said disk in at least a swinging direction and said record player including means for lowering said pickup arm at a desired position, a pickup arm drive device comprising:

at least one light source disposed in the vicinity of said stylus;

a first light receiving element disposed on said cartridge for receiving light emitted from said light source and reflected by said record disk, and providing an output;

a second light receiving element disposed on said cartridge and offset with respect to said first light receiving element in said swinging direction, said second light receiving element receiving light emitted from said light source and reflected by said record disk, and providing an output;

subtraction means for substracting the outputs of said first and second light receiving elements in order to provide a subtraction signal, said subtraction signal having a first value when said pickup arm approaches said desired position; and means for halting the swinging movement of said pickup cartridge and for lowering said pickup cartridge when the outputs of said first and second light receiving elements become equal to each other after said subtraction signal has taken said first value indicating that said pickup arm has approached said desired position.

5. In a record player for playing a record disk, said player being of the type having a pickup arm carrying a pickup cartridge with a stylus thereon, said pickup arm being movable with respect to said disk in at least a swinging direction and said record player including means for lowering said pickup arm at a desired position, and an automatic music selection device, a pickup arm drive device comprising:

first detection means in the vicinity of said stylus for detecting light reflected from said disk and providing an output;

second detection means in the vicinity of said stylus and offset with respect to said first detection means along said swinging direction, and providing an output; and control means for providing a first signal in response to a detected difference exceeding a maximum value between said detection means outputs and for lowering said pickup arm when the difference between said detection means outputs becomes less than a predetermined value after the occurrence of said first signal.

6. A pickup arm drive device as claimed in claim 5, wherein said control means comprises a first comparator ($OP_1$) for subtracting said detection means outputs to provide a subtraction signal, and a second comparator ($OP_3$) for comparing said subtraction signal to a first threshold level to generate said first signal during movement of said pickup arm in a first swinging direction.

7. A pickup arm drive device as claimed in claim 6, wherein said control means further comprises a third comparator ($OP_4$) for comparing said subtraction signal to a second threshold level to provide said first signal during movement of said pickup arm in a second swinging direction opposite said first swinging direction.

8. A pickup arm drive device as claimed in claim 5, wherein said control means comprises a first comparator (OP$_1$) for subtracting said detection means outputs to provide a subtraction signal, reference voltage generating means (VR) for generating a reference voltage, reference voltage comparison means (OP$_2$) for comparing said subtraction signal to said reference voltage to provide a control signal indicating when said detected difference has fallen below said predetermined value, and pickup arm drive means for driving said pickup arm in accordance with said control signal after the occurrence of said first signal.

9. A pickup arm drive device as claimed in claim 8, wherein said control means includes means for counting said first signals and for lowering said pickup arm when said difference falls below said predetermined value only after a desired one of said first signals has occurred.

10. A pickup arm drive device as claimed in claim 8, wherein said pickup arm drive means includes a comparator (OP$_5$) for receiving said control signal and comparing said control signal to a control reference signal to generate a drive signal for driving said pickup arm, and speed detection means (12) for providing as at least a portion of said control reference signal a signal representing the speed of pickup arm movement in said swinging direction.

11. A pickup arm drive device as claimed in claim 6, wherein said first comparison means comprises said one comparator and means for selectively providing to said one comparator either one of two different threshold levels in accordance with the direction of movement of said pickup arm.

12. A pickup arm drive device as claimed in claim 11, further comprising means (82, C$_1$, C$_2$) for selectively providing said sensor outputs to said one comparator with either one of two different time constants.

13. A pickup arm drive device as claimed in claim 5, further comprising muting means for muting the output of said stylus in response to a muting signal, and means for inhibiting said muting signal when said difference is less than a predetermined value.

14. A pickup arm drive device as claimed in claim 13, wherein said means for inhibiting said muting signal inhibits said muting signal when said sensor outputs are substantially equal.

* * * * *